J. E. DRESSLER.
NUT LOCK.
APPLICATION FILED JAN. 7, 1908.
904,606.  Patented Nov. 24, 1908.
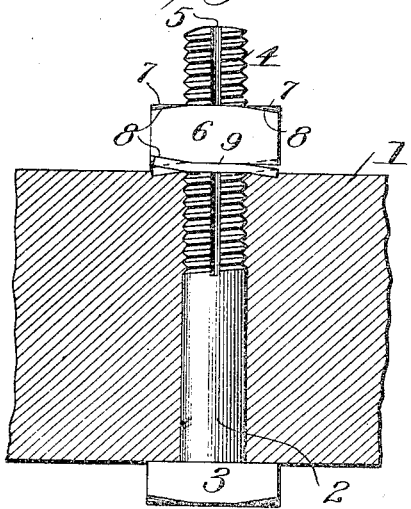
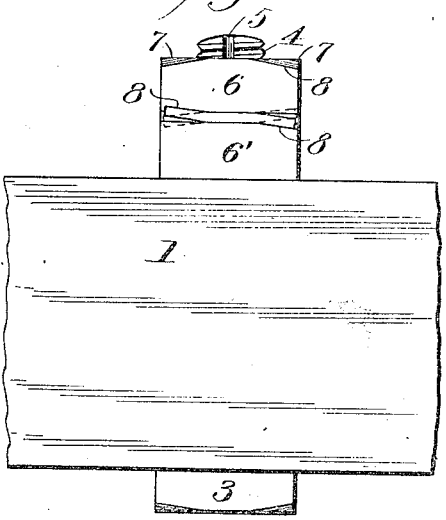
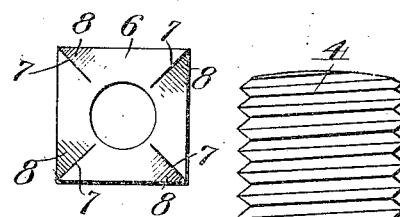
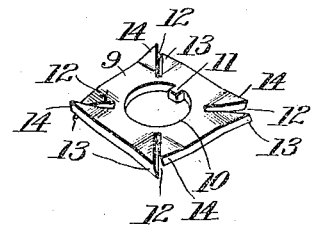
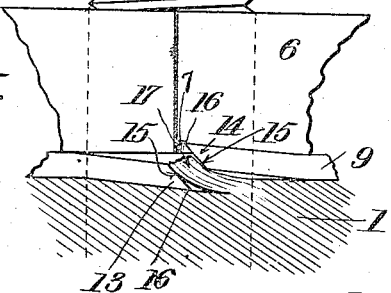
Inventor
Jeremiah E. Dressler
Witnesses
C. N. Walker.
S. Johnson
By E. E. Vrooman,
his Attorney.

UNITED STATES PATENT OFFICE.

JEREMIAH E. DRESSLER, OF ROANOKE, VIRGINIA.

NUT-LOCK.

No. 904,606.

Specification of Letters Patent.

Patented Nov. 24, 1908.

Application filed January 7, 1908. Serial No. 409,732.

*To all whom it may concern:*

Be it known that I, JEREMIAH E. DRESSLER, a citizen of the United States, residing at Roanoke in the county of Roanoke and State of Virginia, have invented certain new and useful Improvements in Nut-Locks, of which the following is a specification, reference being had therein to the accompanying drawing.

This invention relates to improvements in nut locks, and particularly to a device for facilitating the holding of, preferably, two nuts together upon a bolt against independent, rotary movement with respect to said bolt, or holding a single nut against independent, rotary movement upon a bolt, or holding the nut and bolt upon a support against independent rotary movement.

Another object of the invention is the improvement of the construction of a washer and a nut, whereby the two can be locked together, against independent, rotary movement upon a bolt, in one direction.

With these and other objects in view, the invention consists of certain novel constructions, combinations, and arrangements of parts, as will be hereinafter fully described and claimed.

In the drawings: Figure 1 is a view in side elevation of a device constructed in accordance with the present invention. Fig. 2 is a view similar to Fig. 1, except that in this figure, I have shown the support in full lines and the washer between two nuts. Fig. 3 is a plan view of a nut. Fig. 4 is a perspective view of a washer constructed in accordance with the present invention. Fig. 5 is a fragmentary view, in side elevation, of a device constructed in accordance with the present invention.

Referring to the drawings by numerals, 1 designates a support, through which extends a bolt 2 provided at one end with a head 3. The bolt 2 is threaded, at 4, near one end, and formed in the threaded end 4, is a longitudinally-extending groove 5.

In constructing the nuts 6, I, preferably, form one or both sides of the same structure, which consists in cutting or filing the face of the nut, at its corners, in a straight line 7, for producing gradually inclined or beveled edges 8; the line 7 constituting a projection or stop, the outer face of which is in the same plane with the face of the nut.

In Fig. 2, the nut 6' is shown as provided only with the beveled portions 8 and stops or projections 7, upon one side, preferably, in this instance, upon the upper face, although the nut 6' can be easily reversed upon the bolt and caused to expose its beveled or peculiarly-constructed ratchet-face at the bottom, in position for engaging a washer 9, as illustrated in Fig. 1. It is to be noted that the stops or projections 7 are formed in pairs, each pair formed on an imaginary line connecting the corners of the two opposite right-angles formed by the sides of the nut, thereby placing the beveled portion 8 in each transverse pair upon opposite sides of an imaginary line drawn on a line with the shoulders or projections 7; this peculiar structure is of importance, owing to the peculiar structure of the washer 9. The washer 9 comprises a body portion provided with a central aperture 10, projecting into which is a lug 11, which is adapted to extend into the groove 5 of the bolt, when said washer is positioned upon said bolt. It will be noted that this lug or lip 11 prevents independent rotary movement of the washer upon the bolt. The washer 9 is provided with inclined slots 12 extending inwardly from each corner. The washer is formed square, and has its outer edges lying, preferably, in the same vertical plane with the sides of the nut or nuts. It is important that these slots 12 be formed at the corners and extend inwardly at an angle from the sides, not at right-angles, because this gives a greater length to the spring lips 13 and 14. The lips 13 extend to one side of the body, and the lips 14 to the opposite side of said body. Each slot is provided with slanting sides 15, Fig. 5, or in other words, is formed at an angle (not at right-angles) to the upper and lower faces of the washer, thereby producing a sharp, cutting edge 16 upon each lip 13 and 14 the entire length thereof.

When the washer is positioned upon the bolt, and the nut is threaded into engagement therewith, one of the beveled portions 8, or if the nut and washer are formed perfectly, each of the beveled portions 8, will be engaged throughout its entire length by a spring-tongue and the sharpened edge will bear against the vertical wall of the shoulder or projection 7 throughout its entire length, and upon slight or normal strain being exerted upon the nut, the tendency of the cutting edges 16 of the walls 15 of the slots 12, is to bite or "grip" deeper into the metal for forming a more positive lock; it is to be noted that the washer and its tongues fit snug against the nut or nuts and its shoulders. When the washer is positioned upon a wooden support, or, in fact, upon a metal support, as shown in Figs. 1 and 5, after the nut has been threaded against said washer and rotation of the bolt is caused, in a backward direction, the lowest lip or lips of the washer will engage, and, consequently, the biting edge 16 will cut into the support; a piece, or pieces, 17 is turned up into the slot and forms a filling means therein, thereby causing a portion of the support (Fig. 5) to fill the slot or slots and form an efficient lock to prevent, preferably, rotation of the bolt upon the support, in one direction.

It is to be noted that I can mount two nuts (Fig. 2) upon a bolt and secure the same against independent rotary movement with respect to said bolt, even though the support carrying said bolt is mounted upon jointed parts of a machine or device, which machine or device constitutes the support carrying the bolt and nuts; the nuts being held securely together, owing to their peculiar structure and the structure of the washer, although said support may have a continuous or intermittent movement, which would normally tend to remove or unscrew an ordinarily constructed bolt or nut.

The forming of the slots upon the washer at the corners causes the same to extend at an angle to the edges, not at right-angles, produces comparatively long spring lips, or tongues, which would not be the case, if they were formed intermediate the corners of the washer, whereby a greater springy or gripping action is obtained than otherwise would be the case, as mentioned. Furthermore, I have provided walls, (producing a very cheap and efficient structure), forming biting or sharpened blades or edges 16 upon the washer for gripping the peculiarly-constructed shoulder or ratchet portions 7 of a nut, and also the support 1.

My washer is formed, preferably, of comparatively stiff metal, although the metal is, preferably, of sufficient resiliency, or has a springy action for permitting the nut or nuts to slide over the spring lips or tongues until the same is tightly positioned.

Under normal conditions, it is to be noted that my locking washer is held between the sides of the nut or nuts and does not project beyond the same, thereby obviating the possibility of injury to the operator, or tearing his clothes, or garments, by the lips or tongues engaging the same, and, beside, removes the tendency of the lips or tongues being destroyed by foreign objects coming in contact therewith, which greatly increases the life of the locking device and the efficiency of the same, owing to the lips or tongues not becoming loose or being destroyed.

What I claim is:

1. In a nut lock, the combination with a bolt provided with a longitudinally-extending groove, of a pair of nuts threaded upon the groove-portion of said bolt, each nut provided upon the face contiguous to the other nut, with a shoulder extending from the corner inward towards the center of the nut, said nut provided with a portion gradually beveled from its flat face inward towards the corner of the nut, producing said shoulder, said beveled portion being deepest at the corner of the nut and terminating in the face of the nut at the inner end of the shoulder, a square washer positioned upon said bolt and interposed between the contiguous faces of said nuts, said washer provided with an integral lug extending into the groove of said bolt, said washer provided at its corners with inclined slots extending inwardly towards the center of the washer, each slot producing lips at each corner extending upon opposite sides of the washer, the shoulders of the nuts at each corner having the beveled portions positioned at opposite sides of an imaginary vertical line passing through the shoulders at opposite corners, whereby the lips at each corner engage the shoulders of the nuts at each corner, and positively lock the nuts against independent rotary movement.

2. In a nut lock, the combination with a bolt provided with a longitudinally-extending groove, of a washer upon said bolt and provided with an integral lug extending into said groove, said washer provided at each corner with an inclined slot extending inward towards the center of the washer, each slot producing lips extending upon opposite sides of the washer, the inclined slot forming inclined, parallel walls the entire length of the slot, each inclined wall producing a cutting-edge the entire length and upon the outer, horizontal edge of the lip, a nut provided with shoulders at each corner, each shoulder extending from the corner inward towards the center of the nut, said nut provided with a portion gradually beveled from its flat face inward towards the corner of the nut, producing said shoulder, said beveled portion being deepest at the corner of the nut and terminating in the face of the nut at the inner end of the shoulder, the shoulders at opposite corners of the nut positioned at opposite sides of an imaginary, vertical line passing through the shoulders at opposite corners, whereby a lip at each corner of said washer may engage a shoulder of the nut at each corner and positively lock the nut against independent rotary movement in one direction upon the bolt.

In testimony whereof I hereunto affix my signature in presence of two witnesses.

JEREMIAH E. DRESSLER.

Witnesses:
R. S. St. Clair,
J. E. Gish.